United States Patent [19]

Langley et al.

[11] Patent Number: 4,547,713
[45] Date of Patent: Oct. 15, 1985

[54] TOROIDALLY WOUND BRUSHLESS DC MOTOR

[75] Inventors: Lawrence W. Langley; Robert L. Fisher, both of Christiansburg, Va.

[73] Assignee: Kollmorgen Technologies Corporation, Dallas, Tex.

[21] Appl. No.: 439,553

[22] Filed: Nov. 5, 1982

[51] Int. Cl.⁴ .................. H02K 21/14; H02K 29/02
[52] U.S. Cl. ...................... 318/254; 310/68 R; 310/164; 310/259; 310/262
[58] Field of Search ............. 310/68 R, 156, 164, 310/262, 180, 181, 184, 216, 254, 259, 267, 68 R; 318/254, 256

[56] References Cited

U.S. PATENT DOCUMENTS

| | | | |
|---|---|---|---|
| 336,087 | 2/1886 | Brush | 310/216 X |
| B 521,044 | 2/1976 | Sims | 310/259 |
| 2,147,791 | 2/1939 | Holst et al. | 310/259 X |
| 2,815,506 | 12/1957 | Tanaka et al. | 310/267 X |
| 2,823,545 | 2/1958 | Bodge | 310/164 X |
| 4,103,197 | 7/1978 | Ikegami et al. | 310/267 |
| 4,188,211 | 2/1980 | Yamaguchi et al. | 148/31.55 X |
| 4,197,146 | 4/1980 | Frischmann | 148/31.57 X |
| 4,268,325 | 5/1981 | O'Handley et al. | 148/31.55 X |
| 4,289,996 | 9/1981 | Barnes et al. | 318/38 |
| 4,373,148 | 2/1983 | Gutz | 310/164 |
| 4,392,072 | 7/1983 | Rosenberry | 310/254 X |
| 4,427,462 | 1/1984 | Senno et al. | 148/31.55 |
| 4,433,474 | 2/1984 | Hemmat | 148/108 X |
| 4,447,750 | 5/1984 | Howlett et al. | 310/89 |

*Primary Examiner*—William M. Shoop, Jr.
*Assistant Examiner*—Bentsu Ro
*Attorney, Agent, or Firm*—Morgan, Finnegan, Pine, Foley & Lee

[57] ABSTRACT

A high speed DC brushless motor in which the stator is toroidal and the stator core does not include winding slots. In the preferred embodiment the core material for the stator is an amorphous metal alloy which provides high speed motor efficiency. For some applications core materials like ferrite or low silicon-alloys can be used. According to one embodiment of the invention a ferrite shielding ring can be added surrounding the motor to further improve high speed efficiency.

7 Claims, 5 Drawing Figures

TOROIDALLY WOUND BRUSHLESS DC MOTOR

This application relates to electric motors and, more particularly, to electric motors capable of operating at extremely high speeds.

BACKGROUND OF THE INVENTION

There are numerous applications, such as scanner drives for infrared radar systems, where the drive motor must be capable of operating at extremely high speeds, typically, up in the range of 60,000 RPM. Although the mechanical load on the motor at running speed is usually modest, the motor must nevertheless be capable of producing considerable torque at lower speeds, in order to reach running speed in a reasonable period of time, i.e., less than 20 seconds. High speed motors are required for various uses which can be either constant speed or controlled variable speed applications.

Operating at extremely high speeds creates problems not only the need for low mechanical friction and precise balance, but also the need for low electromagnetic friction. At 60,000 RPM, for example, the switching rate of the magnetic flux is 1,000 hertz, or multiples thereof. If the magnetic material associated with the motor windings has substantial hysteresis or eddy current losses, there will be significant power losses at high speeds.

DC motors without rotating iron have been constructed so that they have negligible magnetic losses and smooth torque without cogging. However, such motors require brushes. Brushes are unacceptable in extremely high speed motors because of the mechanical friction of the sliding contact and because, at these high speeds, even the slightest eccentricity in the commutator surface results in brush bounce and unreliable contact.

Brushes can be eliminated in DC motors by using known brushless motor designs. Generally, a brushless DC motor includes rotating permanent magnets, stator windings, and a rotor position sensor to control solid state switching for commutating the windings. The windings are normally located in stator slots. In high speed motors the rotor should be as small as possible and this results in a relatively small slot opening on the inside diameter of the stator. As a result, such motors are difficult to construct and generally must be wound by hand.

Induction motors eliminate the need for brushes and are capable of operating at high speeds. These motors, however, suffer from similar stator winding problems as do the brushless DC motors. In addition, such induction motors have poor low speed torque and generally lack precise speed control capability.

An object of this invention is to provide a high speed brushless DC motor.

Another object is to provide an electric motor with very low electromagnetic losses.

Still another object is to provide a high speed motor which can readily be constructed using automatic winding machines.

SUMMARY OF THE INVENTION

In accordance with this invention a brushless DC motor is constructed without stator winding slots. The stator magnetic material is in the form of a ring and the windings have a toroidal configuration about the ring. Preferably, the winding includes six segments connected into a WYE circuit configuration. Although it is difficult, or impossible, to machine wind small slotted stators, machines capable of making small toroidal windings are readily available. The toroidal winding according to the invention has shorter end turns than a conventional slotted winding and, for certain motor designs (particularly two pole motor designs) the winding uses less copper and, hence, has lower copper losses. The reduction in the end turn requirements in the motor according to this invention makes possible the use of a position sensor located to operate in response to the rotor magnetic field.

The performance of a high speed motor according to the invention is greatly dependent on the magnetic material characteristics of the stator core. An efficient high speed motor can be constructed using a laminated, low hysteresis loss, magnetic steel core material such as a silicon-iron alloy or a nickel-iron alloy material.

A superior magnetic material, however, has been found to be amorphous metal alloys known by the trade name Metglas. The difficulty in using this material, however, is that it cannot be cut, punched or sheared to provide the laminations for a conventional motor design. However, Metglas is available in the form of a thin strip which can be coiled to provide a ring structure suitable for a toroidal stator winding core. By utilizing the thin strip and relying on the relatively high resistivity of the amorphous magnetic material, eddy current losses in the stator core can be reduced to acceptable levels during high speed motor operations.

A superior core structure can also be made from ferrite materials. Ferrites characteristically have low saturation flux density and very low eddy current losses. Motors with ferrite cores cannot normally match the torque output of a comparable motor with a Metglas core, but can achieve better efficiency at very high speeds. Thus, ferrite cores are preferred in certain applications.

Further, it has unexpectantly been found that surrounding motors of the type described herein with a ferrite shielding ring tends to reduce high speed losses. Normally shielding absorbs energy and increases losses. In this case, however, the shielding was found to reduce losses at high speeds. Although the reasons for this unexpected result are not precisely known, it seems that the shielding tends to decouple the high speed rotating magnets from stationary iron outside the motor and thereby reduces losses.

BRIEF DESCRIPTION OF THE DRAWINGS

The foregoing and other objects will become apparent from the following detailed specification which sets forth an illustrative embodiment of the invention. The drawings form part of this specification wherein.

DETAILED DESCRIPTION OF AN ILLUSTRATIVE EMBODIMENT

Figure 1:
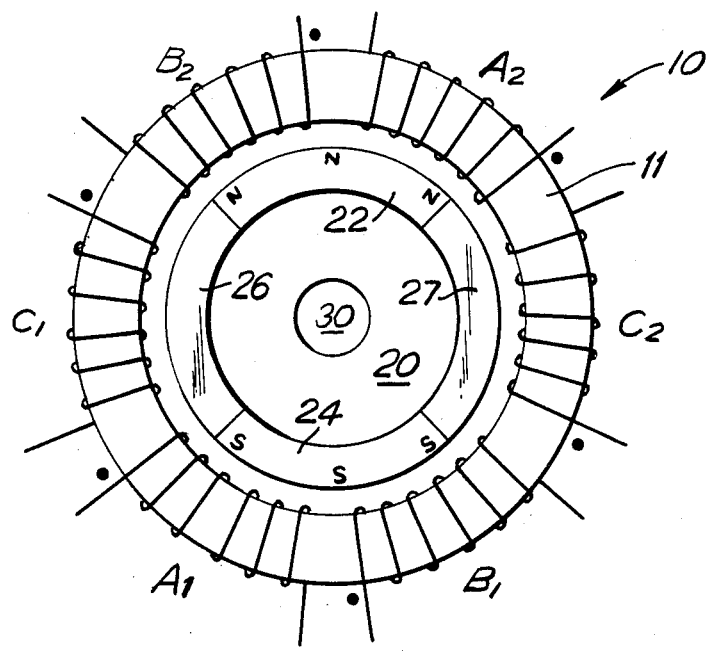
FIG. 1 is a schematic illustration of the motor according to this invention.
Figure 2:
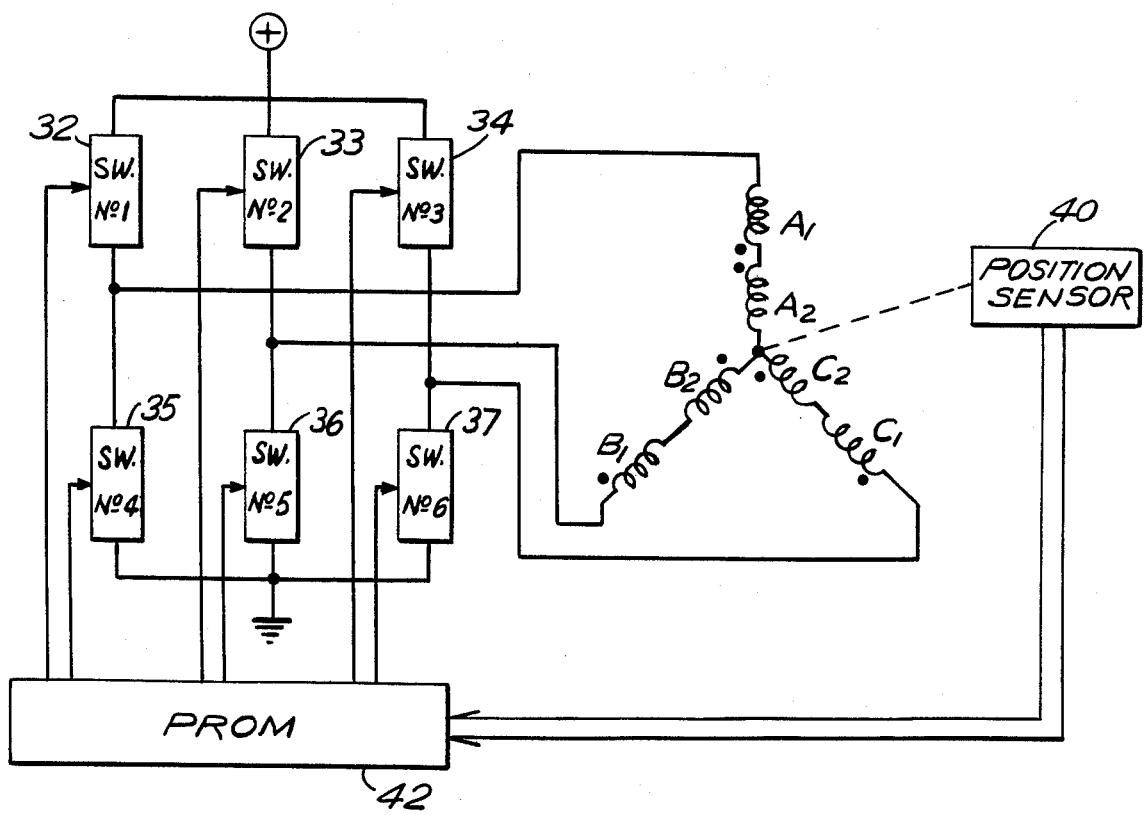
FIG. 2 is a schematic block diagram illustrating the commutation circuitry for the motor according to the invention.

The general construction of the motor according to the invention is shown diagrammatically in FIGS. 1 and 2. The motor includes a stator 10 which embodies the motor windings, a permanent magnet rotor 20 (FIG. 1) and switching logic for commutating the windings (FIG. 2).

Stator 10 includes a magnetic core in the form of a ring of magnetic material. The stator winding is in the form of six toroidal winding segments $A_1$, $A_2$, $B_1$, $B_2$, $C_1$, and $C_2$. As shown in FIG. 2, the winding segments are interconnected into a WYE configuration. Windings $A_1$ and $A_2$ are connected in series such that current flow in the winding portion inside the core is in one direction for winding segment $A_1$ and in the opposite direction in winding segment $A_2$. Winding segments $B_1$ and $B_2$, and $C_1$ and $C_2$, are similarly connected in series to provide current flow in opposite directions on the inside of the core.

Rotor 20 includes two arcuate permanent magnets 22 and 24 each covering about a 120 degree sector of the rotor surface. Magnet 22 is magnetized to provide a north pole on the rotor surface whereas magnet 24 is magnetized to provide a south pole on the rotor surface. The permanent magnets are mounted on a hub 30 of magnetic material. A suitable non-magnetic material is used to produce fillers 26 and 27 to round out the rotor surface.

Current flow in the windings is controlled by six solid state switches 32-37 connected into a three-phase bridge configuration. Switches 32-34, when conductive, connect winding phases A, B and C respectively, to the positive source whereas, switches 35-37 connect the respective winding phase to ground.

The motor also includes a position sensor 40 coupled to the rotor to indicate rotor position. Preferably, the position sensor includes several Hall detectors arranged to indicate incremental movements of 60 electrical degrees. Through the use of multiple Hall detectors, a parallel digital position indication can be provided which is directly usable as an address to a programmable read only memory (PROM) 42. The output from the memory 42 is connected to control the conductive state of switches 32-37. The memory is programmed to activate the correct combination of switches for each position address furnished by the position sensor. The arrangement used to control winding commutation via a programmable memory is described in co-pending application entitled "Brushless Motor Controller" S.N. No. 282,796 filed July 13, 1981.

Clockwise rotation of the motor can be initiated by closing switches 32 and 36 causing current flow through windings $A_1$ and $B_1$ as well as winding segments $B_2$ and $A_2$. Current flow through winding segments $A_1$ and $B_1$ is in the same direction on the inside of the core and interacts with the flux of magnet 22 to provide a clockwise torque. Likewise, current flow through winding segments $B_2$ and $A_2$ is in the same direction on the inside of the stator core and is in the direction which interacts with permanent magnet 24 to likewise produce a clockwise torque. Next, switch 36 is turned off and switch 37 is turned on to thereby energize the windings in phases A and C. Current flow through winding segment $A_2$ is in the same direction as in winding segment $C_2$ and similarly current flow in winding segment $C_1$ is the same as in winding segment $A_1$. Thus, these pairs of winding segments interact with the magnetic flux of the rotor magnets to produce a clockwise torque.

A switching sequence controlled by memory 42 continues in this fashion successively energizing winding segment pairs. The sequence is selected to produce a rotating magnetic field.

High speed motors are preferably designed in a two-pole configuration to achieve the highest speed to frequency ratio. In a conventional two-pole winding with a slotted stator core, the armature coils occupy slots which are about diametrically opposite from one another. As a result, the copper end turns are lengthy which, in turn, results in high resistive losses, particularly when operating at high speeds. With the toroidal winding according to the invention, the length of the copper between active conductors is substantially reduced and, hence, resistive losses are reduced.

The stator windings are toroidally wound on the magnetic core, thus avoiding the need for slots in the stator and the associated problem of inserting windings in the narrow slot openings on the inside diameter of the stator. With this arrangement, however, the active part of the winding, i.e., that portion of the toroidal winding inside the magnetic stator core, is located within the motor air gap. In other words, this motor construction results in a larger air gap than for a slotted construction since the air gap must be sufficient to contain the winding. The permanent magnets in the motor are preferably of a type capable of developing a high flux density across a relatively large air gap. Rare earth magnets, such as samarium-cobalt magnets produce excellent results.

The magnetic material for the stator core is selected to provide a minimum power loss. Because of the high switching rate in a high speed motor, hysteresis and eddy current power losses become critical at high speeds. A suitable core structure can be made using nickel-iron laminations. Nickel-iron alloys provide a high permeability and low hysteresis losses.

Figure 5:
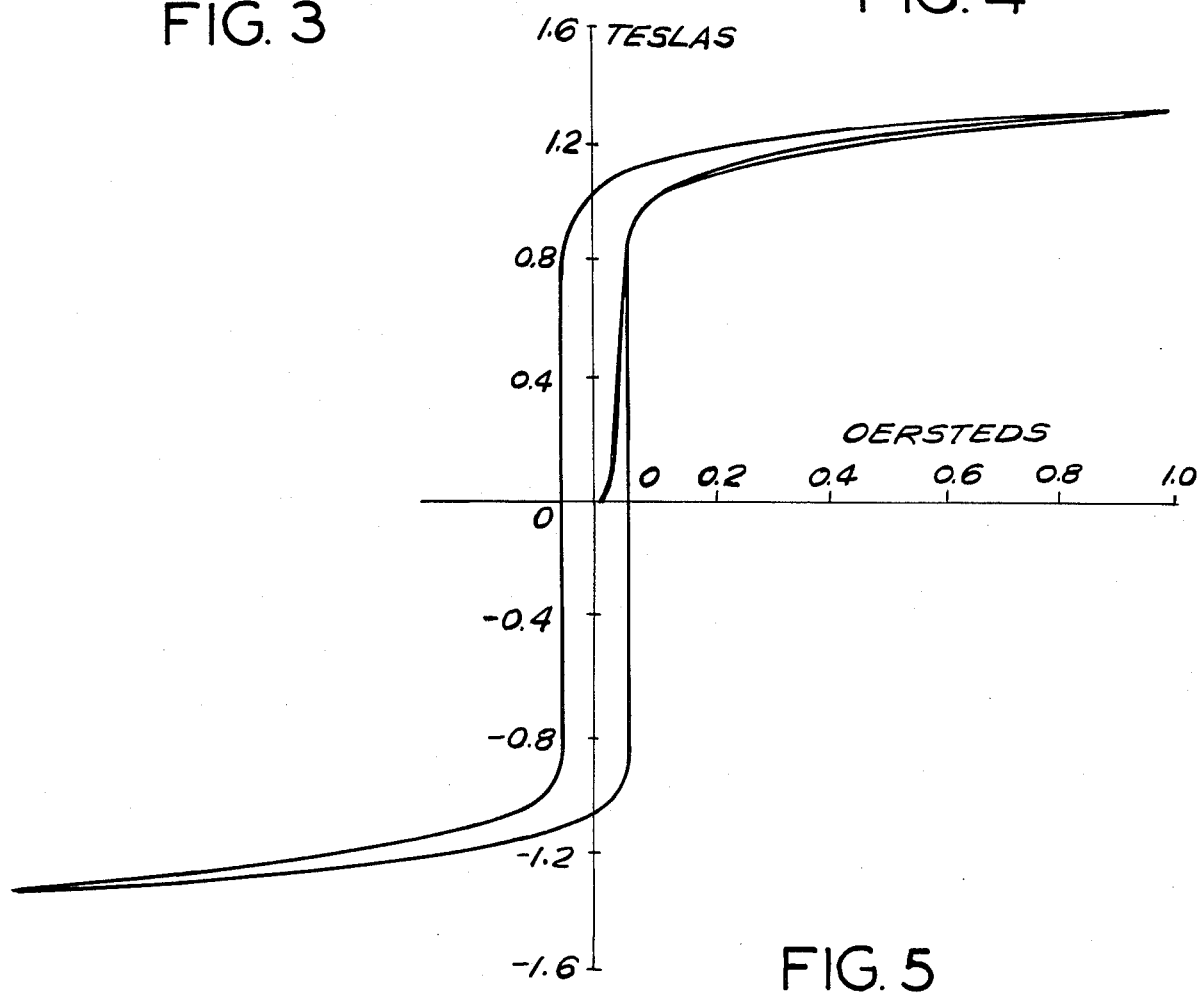
FIG. 5 is a diagram showing the hysteresis loop for a preferred magnetic core material for use in the motor according to the invention.

A preferable core structure for the stator according to this invention is constructed using amorphous ferromagnetic alloy materials. Amorphous ferromagnetic materials can be produced by extremely rapid cooling of a molten film alloy (such as an iron-silicon alloy) over a revolving drum such that, in cooling, the material does not have time to form a structured lattice. Such materials are available from Allied Chemical under the trade name Metglas. Allied's Metglas alloy 2605SC: $Fe_{81}B_{13.5}Si_{3.5}C_2$ has excellent characteristics as indicated by the hysteresis loop reproduced in FIG. 5. The relatively small area inside the hysteresis loop indicates that power losses would be low even at flux switching rates in excess of 1,000 hertz.

Unfortunately, however, amorphous ferromagnetic alloys tend to be extremely hard and available only in very thin sheets. As a practical matter, they cannot be cut, punched or sheared to provide laminations for core structures. The thin sheets can, however be made narrow enough to be coiled to form a spiral ring-shaped core. With this structure there are no significant eddy currents in the circumferential direction since the ends of the strip do not connect. The relatively high resistivity (approximately $125 \times 10^{-6}$ OHM centimeters) and thin cross section of the amorphous ferromagnetic alloy material is relied upon to reduce eddy currents in the plane of the strip to an acceptable level.

Another preferable core structure involves the use of ferrites, particularly where torque requirements are modest and there is a need for maximum efficiency. Manganese Zinc ferrite such as available from the Ferroxcube Div. of Amperex Electronic Corp., Saugerties, New York 12477 as "3C8" is a suitable ferrite material for core 11 and can be formed in the desired ring configuration by sintering or modling. The high motor efficiency is a result of the low flux density and low eddy current losses of the ferrite material.

Comparison characteristics of the three core material is set forth in Table I below:

TABLE I

| Allegheny Ludlum 4750 48% nickel-iron .006" thick | Core loss .26 watts/kg at 1.1 Tesla, 60 Hertz $B_{sat}$ = Tesla Resistivity = 50 $\mu$ohm-cm |
|---|---|
| Metglas Alloy 2605 SC | Core loss .26 watts/kg at 1.26 Tesla, 60 Hertz $B_{sat}$ = 1.61 Tesla Resistivity = 125 $\mu$ohm-cm |
| Ferroxcube 3C8 Manganese-Zinc Ferrite | Core loss .081 watts/kg at 0.3 Tesla, 60 Hertz (est.) $B_{sat}$ = Tesla Resistivity = $10^4$ $\mu$ohm-cm |

From the above table it can be seen that flux density ($B_{sat}$) should be above 0.3 Tesla, resistivity above at least about 40 $\mu$ohm-cm, and the core loss below about 0.30 watts/kg.

The amorphous Metglas material achieves the highest flux density and, hence, has the greatest torque producing capability, at low losses, i.e., low magnetic core losses and low eddy current losses (high resistivity). The Nickel-iron core has a lower flux density, a comparable core loss and somewhat high eddy current losses. The ferrite core is much lower in flux density, and hence, is usable only in motors with low torque requirements. The advantage of the ferrite material, however, is the very low hystersist and eddy current losses. The ferrite material are relatively inexpensive, but are difficult to fabricate in small production runs. Metglas is the most expensive but, for most applications achieves the best performance.

Figure 3:
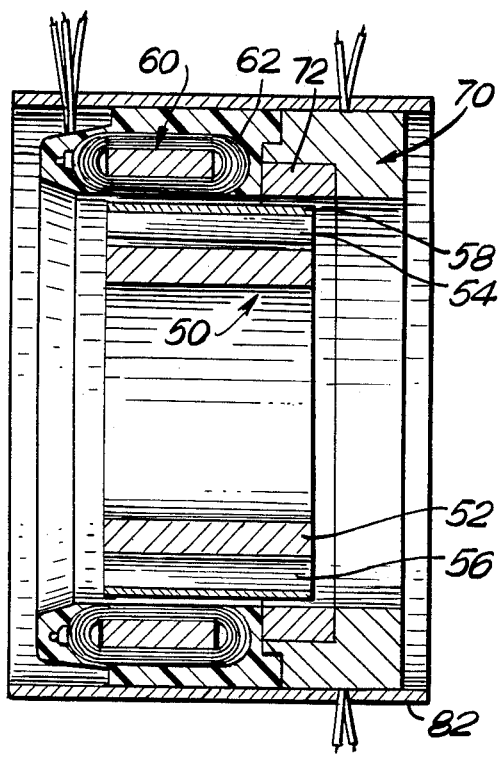
FIG. 3 is a cross-sectional view of a motor according to the invention.
Figure 4:
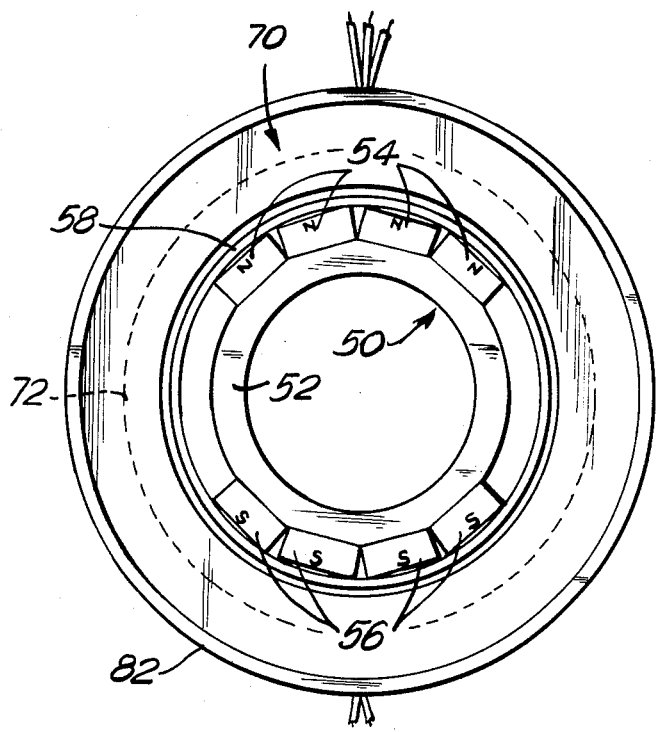
FIG. 4 is an end view of the motor showing magnetic features according to the invention.

FIGS. 3 and 4 are cross-sectional and end views, respectively, of a motor according to the invention including a rotor 50, a stator 60 and a position sensor assembly 70.

The rotor structure is best seen in FIG. 4. The rotor includes permanent magnets mounted on a magnetic yoke ring 52 which has eight flats machined into the circumferential surface. Four permanent magnets 54 are mounted on one side and magnetized to collectively provide a north pole for the rotor. Similarly, four permanent magnets 56 are mounted on the other side and are magnetized to collectively provide the south pole for the rotor. A glass fiber reinforced plastic retaining ring 58 surrounds the magnets and a suitable material is used to fill the voids between the yoke and the retaining ring. The retaining ring is desirable in the high speed rotor to contain the magnets against centripetal forces. The rotor can be mounted on a rotating shaft, not shown, and is carefully balanced for high speed operation.

The stator includes a toroidal winding 62 wound around a core of high permeability low loss magnetic material as previously described. The winding and core material is encapsulated in a suitable non-magnetic material. Position sensor assembly 70 is mechanically coupled to stator 60 and includes six Hall detectors 72 spaced 60 degrees apart surrounding the rotor. Because of the toroidal winding and the modest end turn space requirements of the motor stator, it is possible to mount the Hall detectors of the position sensor so that they detect the magnetic flux of the rotor directly. This arrangement eliminates the need for a separate rotating magnetic structure for the position sensors. The Hall sensors are connected to provide a digital indication switching address for PROM 42 in FIG. 2.

As shown in FIGS. 3 and 4, a ferrite shielding ring 82 can be located surrounding the motor. The shielding ring can be made from the aforementioned "3C8" manganese zinc ferrite from Ferroxcube. Normally, shielding structures absorb energy and, consequently, reduce motor efficiency. Unexpectedly, however, in this case, shielding was found to reduce losses and increase motor efficiency. Although the precise explanation for this unexpected result is not known, it is believed that the shielding tends to decouple the high speed rotating magnets 54 and 56 from stationary iron outside the motor to thereby reduce losses.

While only one embodiment has been described in detail it should be apparent to those skilled in the art that there are other variations within the scope of this invention as more particularly defined in the appended claims.

We claim:

1. In a high speed electric motor, the combination of:
   a magnetic stator core,
   in the shape of ring without winding slots
   made from alloy magnetic material having flux density (B sat) above 0.3 Tesla, a resistivity above 40 uohm-cm, and a core loss below 0.30 watts/kg's;
   a rotor movable relative to said core, said rotor including at least one rare earth permanent magnet;
   a stator winding located in the air gap between said rotor and said stator core;
   a Hall device position detector for indicating the position of said permanent magnet; and
   means coupled to said position detector for energizing said winding to provide a rotating magnetic field.

2. An electric motor according to claim 1 wherein said stator winding located in the air gap is a toroidal winding on said magnetic stator core.

3. An electric motor according to claim 1 wherein said position detector includes Hall devices to detect magnetic flux from said rotor permanent magnet.

4. An electric motor according to claim 1 wherein said permanent magnet is a samarium-cobalt material.

5. An electric motor according to claim 1 wherein said magnetic core is made from a rapidly quenched amorphous magnetic material.

6. An electric motor according to claim 1 wherein said magnetic core is made from a ferrite material.

7. An electric motor according to claim 1 wherein said magnetic core is made from a nickel iron alloy material.

* * * * *